United States Patent Office 3,232,385
Patented Feb. 1, 1966

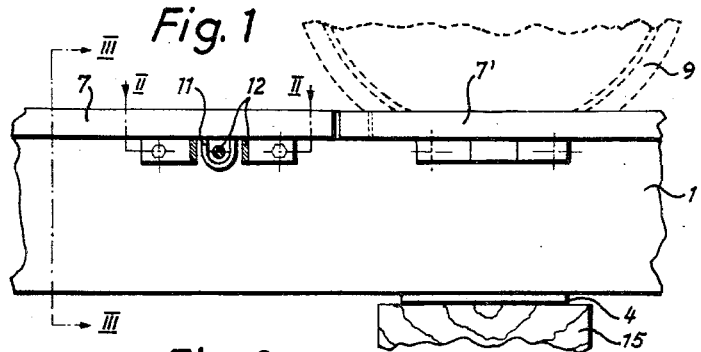
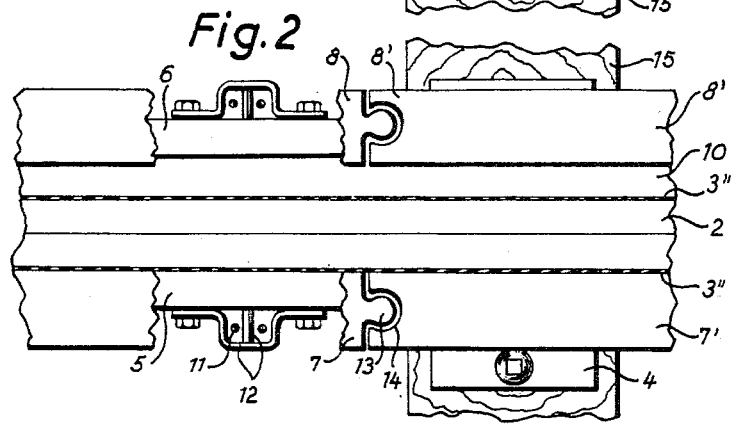
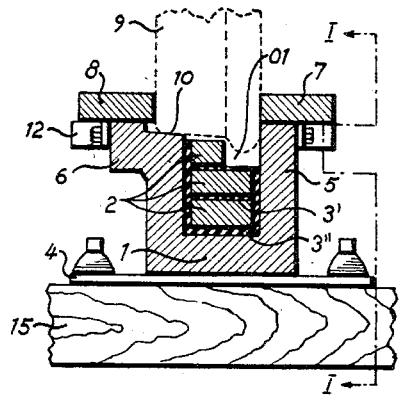

3,232,385
DEVICE FOR BRAKING RAILWAY VEHICLES WITH THE AID OF MAGNETIC FIELDS
Jakob Huber, Johanniterstrasse 3, Bremgarten, near Bern, Switzerland
Filed Sept. 20, 1962, Ser. No. 224,937
Claims priority, application Switzerland, Sept. 28, 1961, 11,265/61
1 Claim. (Cl. 188—62)

The invention disclosed herein is concerned with an arrangement or device, disposed at a rail, for braking railway vehicles by forces exerted by magnetic fields produced in an upwardly open magnetic circuit by currents flowing in the rails, said magnetic circuit being formed by the rail, having a longitudinal groove provided therein, for receiving at least one electrical conductor and at least the wheel rims of vehicles running on the rails, and being substantially closed over the wheel rims.

It is known to affect the running of railway vehicles, that is, the braking and/or the acceleration thereof, by electrodynamic forces, by the use of rails constructed in the general manner indicated above. However, the magnetic circuit is in most such cases only approximately closed in view of the tolerances in the gauge width of the wheel sets, resulting in scatterings in the magnitude of the electrodynamic forces exerted at a given current.

In order to avoid this drawback, it has been proposed to mount one of the two rails of a track so as to be movable transversely to the direction of travel of the vehicle riding thereon. Such movable mounting of a rail entails a relatively great constructional expenditure, and has the drawback that the desired effect is not obtained, or only incompletely obtained, in the event that wheel sets with different gauge width should happen to be along the respective rail section.

According to the invention, a considerable improvement can be achieved incident to the braking of railway vehicles, by providing, at least upon a part of the rail which delimits the longitudinal groove laterally, ferromagnetic brake bars, and movably mounting such brake bars so that they are, responsive to the forces produced upon magnetic excitation of the magnetic circuit, pressed against the respective rail and likewise pressed laterally against the wheel rims of vehicles running along the rails. The pressing of the brake bars against the wheel rims results in complete closure of the magnetic circuit. Accordingly, a stronger magnetic flux will at a given magnetic excitation flow through the respective wheel, thereby producing a stronger electrodynamic braking power. The pressing of the brake bars against the wheel rims also exerts mechanical brake forces.

It is moreover possible, by suitably dimensioning the two force components, namely, the electrodynamical and mechanical force components, to achieve a desired functional course with respect to the speed of travel of the railway vehicles. The ready movability of the brake bars as well as the coaction of the force components, reduces to a considerable extent the scattering of the brake power.

As compared with known mechanical track brakes operating with magnetically controlled brake shoes, the arrangement according to the invention offers the following advantages:

The arrangement is very simple, structurally sturdy, and can be produced at relatively low cost. It can be mounted upon a normal tie structure without requiring any particular foundation. Lightweight and easily exchangeable brake bars constitute the only movable parts. The control of the brake bars is effected by magnetic forces, requiring no particular journals, links or the like.

Details of an arrangement according to the invention will appear from the description of an embodiment which is rendered below with reference to the accompanying drawing.

FIG. 1 is a side elevational view of a part of a rail with portions in section, taken approximately on the line I—I of FIG. 3;

FIG. 2 illustrates the rail in top plan view with portions in section taken approximately on the line II—II of FIG. 1; and FIG. 3 is a cross-sectional view taken approximately on the line III—III of FIG. 1.

The rail 1 is formed of a rigid prismatic body made of ferro-magnetic material, for example, structural steel. The prismatic body is advantageously cross-sectionally U-shaped and can be produced in a rolling mill operation. The longitudinal groove 01 of the rail contains electrical conductors 2 for exerting magnetomotoric forces of a few ten thousand ampere windings. The conductors 2 may be electrically connected in serial or in parallel relationship, depending upon the available current source. The rail 1 as such may thereby also be employed as a conductor. The conductors 2 are in the first case electrically insulated by insulation means 3', 3"; such insulation can be omitted in the latter case. It may be desirable, for reasons having to do with measuring techniques, to electrically insulate the exciting circuit form the rail. The insulating means 3" forms in such case a lining for the rail groove.

The configuration of the longitudinal rail groove 01, such that it can also accommodate running parts of wheels 9, at least the wheel rims, forms a guidance for the wheels on the track.

Upon the rail legs 5 and 6 which delimit the longitudinal groove laterally, are movably mounted prismatic brake bars 7 and 8. Such mounting may merely consist in simply placing the brake bars on top of the legs 5 and 6. Upon excitation of the rail, these brake bars will be held magnetically against lifting off from the legs 5 and 6 while still being relatively well slidable along the respective contacting surfaces.

Magnetic forces will be produced upon entry of a wheel, effecting shifting of the brake bars inwardly toward and into engagement with the rims of the wheels. As shown in FIG. 3, the magnetic circuit about the conductors 2 is thereby closed over the brake bars and the wheel, thus producing, as already mentioned, a greatly increased brake force. FIG. 3 shows two brake bars 7 and 8, one disposed on each side of the wheel 9; however, even the use of only one of these brake bars will bring about a considerable improvement.

The structure of the rail is advantageously realized so that the topmost plane of the brake bar does not project with respect to the running plane 10 by more than about 50 millimeters which is specified by open space profile requirements. Satisfaction of this requirement will adapt the rail for use in connection with all railway vehicles, including locomotives, without necessitating lowering of parts of the rail. A costly construction entailing intensive maintenance work, is thereby avoided. The manner of magnetically holding the brake bars on the rail legs 5 and 6 likewise avoids costly journal structures. In order to prevent dislocation of the brake bars in deenergized condition thereof, there are provided ears 11 or the like which slide loosely with respect to guide means fastened on the rail and forming stops 12. It is advantageous to guide in this manner, for example, each end of the respective brake bars.

The rails 1 are often provided in lengths of 30 meters and even longer, in order to avoid joints as much as possible. However, the brake bars such as the bars 7, 8 are for good engagement with the wheels furnished in shorter lengths, for example, less than 10 meters. It is advantageous, in the interest of uniform wear and quiet running of the cars along the rails, to articulately join or couple the ends of successive brake bars 7, 7' and 8, 8', respectively, so that the transverse shifting thereof can be transmitted from one to the other brake bar.

A simple example of such articulate coupling is shown in FIGS. 1 and 2, wherein the end of one brake bar is provided with a head member 13 which is disposed in a recess 14 formed at the end of the adjacent brake bar. The head and the recess may be of prismatic configuration with the facing surfaces thereof extending perpendicularly to the sliding plane.

Base plates such as indicated by numeral 4 are in given spacing connected with the rail, serving for the mounting thereof upon ties 15 or the like. Both rails of a track may be fastened in this manner. Since sufficient movability can be provided for the brake bars, there is no danger of a situation, arising on account of practically possible gauge width tolerances of the wheel sets, in which the magnetic circuit about the electrical conductors could not be closed, which would result in diminished brake power.

Changes may be made within the scope and spirit of the appended claim which defines what is believed to be new and desired to have protected by Letters Patent.

I claim:

A railway braking device for braking vehicles, running along a rail, with the aid of magnetic forces which are produced by rail currents, comprising a rail structure of generally U-shape in transverse cross section forming a longitudinally extending groove, at least one longitudinally extending electrical conductor disposed in said groove, the latter accommodating at least the rims of the vehicle wheels, said rail structure and conductor forming an upwardly open magnetic circuit, said magnetic circuit being substantially closed over the wheel rims, ferromagnetic brake bars movably disposed upon the longitudinally extending top edge of at least one of the parts of the rail which laterally delimits said longitudinal groove, cooperable guide means on said brake bars and one of said parts of the rail for limiting the movability of said brake bars, said brake bars, responsive to forces produced upon excitation of the magnetic circuit, being pressed throughout their length with the respective rail part and being, in the presence of vehicle wheels likewise laterally pressed into engagement with the rims of such wheels, said brake bars being shorter than the rail, and means for articulately linking the ends of the brake bars successively positioned along the rail.

References Cited by the Examiner

UNITED STATES PATENTS

| | | | |
|---|---|---|---|
| 952,493 | 3/1910 | Atwood | 188—62 |
| 1,778,531 | 10/1930 | McWhirter | 188—62 |
| 1,812,190 | 6/1931 | Baseler | 188—62 |
| 1,818,933 | 8/1931 | Ross | 188—62 |
| 1,920,760 | 8/1933 | Meyer | 188—62 |
| 1,990,893 | 2/1935 | Brown | 188—62 |

MILTON BUCHLER, *Primary Examiner.*

ARTHUR L. LA POINT, *Examiner.*